United States Patent
Jeffrey et al.

(10) Patent No.: US 11,720,733 B2
(45) Date of Patent: **\*Aug. 8, 2023**

(54) INTEGRATED CIRCUIT DESIGN SYSTEM AND METHOD

(71) Applicant: Google LLC, Mountain View, CA (US)

(72) Inventors: Evan Jeffrey, Santa Barbara, CA (US); Julian Shaw Kelly, Santa Barbara, CA (US); Joshua Yousouf Mutus, Santa Barbara, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/340,825

(22) Filed: Jun. 7, 2021

(65) Prior Publication Data

US 2021/0294955 A1 Sep. 23, 2021

Related U.S. Application Data

(63) Continuation of application No. 16/470,593, filed as application No. PCT/US2016/068491 on Dec. 23, 2016, now Pat. No. 11,062,073.

(51) Int. Cl.
*G06F 30/39* (2020.01)
*G06F 30/327* (2020.01)
(Continued)

(52) U.S. Cl.
CPC ............ *G06F 30/39* (2020.01); *G06F 30/327* (2020.01); *G06F 30/33* (2020.01); *G06F 30/337* (2020.01);
(Continued)

(58) Field of Classification Search
CPC ........ G06F 30/39; G06F 30/327; G06F 30/33; G06F 30/337; G06F 30/392; G06F 30/398; G06F 2111/04; G06F 2111/02
(Continued)

(56) References Cited

U.S. PATENT DOCUMENTS 5,459,673 A 10/1995 Carmean
5,619,420 A 4/1997 Breid
(Continued)

FOREIGN PATENT DOCUMENTS

CN 102067130 A 5/2011
CN 102169515 A 8/2011
(Continued)

OTHER PUBLICATIONS

JP Notice of Allowance in Japanese Application No. 2020-158351, dated Sep. 27, 2021, 6 pages (with English translation).
(Continued)

*Primary Examiner* — Phallaka Kik
(74) *Attorney, Agent, or Firm* — Fish & Richardson P.C.

(57) ABSTRACT

Methods, systems, and apparatus, including computer programs encoded on a computer storage medium, for parameterization of physical dimensions of discrete circuit components for component definitions that define discrete circuit components. The component definitions may be selected for use in a device design. When a parametrization of a particular version of a discrete circuit component definition is changed, the version level of the device design is also changed and the circuit layout for the device design is physically verified for the new version level.

21 Claims, 3 Drawing Sheets

(51) Int. Cl.
*G06F 30/337* (2020.01)
*G06F 30/398* (2020.01)
*G06F 30/33* (2020.01)
*G06F 30/392* (2020.01)
*G06F 111/02* (2020.01)
*G06F 111/04* (2020.01)

(52) U.S. Cl.
CPC .......... *G06F 30/392* (2020.01); *G06F 30/398* (2020.01); *G06F 2111/02* (2020.01); *G06F 2111/04* (2020.01)

(58) Field of Classification Search
USPC ........... 716/100, 103, 104, 106, 111; 703/14
See application file for complete search history.

(56) References Cited

U.S. PATENT DOCUMENTS

| | | | |
|---|---|---|---|
| 5,666,288 A | 9/1997 | Jones | |
| 6,424,959 B1 | 7/2002 | Bennett | |
| 6,813,597 B1 | 11/2004 | Demler | |
| 6,920,620 B2* | 7/2005 | Hsiao | G06F 30/398 716/112 |
| 6,961,918 B2 | 11/2005 | Garner | |
| 7,076,415 B1 | 7/2006 | Demler | |
| 7,512,911 B1 | 3/2009 | Goren | |
| 7,716,612 B1 | 5/2010 | Gupta | |
| 7,844,570 B2* | 11/2010 | Netz | G06F 16/283 707/606 |
| 8,015,517 B1 | 9/2011 | Reis | |
| 8,271,916 B2 | 9/2012 | Motiani | |
| 8,302,057 B2 | 10/2012 | Saika | |
| 8,584,052 B2* | 11/2013 | Chen | G03F 7/70433 430/30 |
| 8,607,185 B1 | 12/2013 | Andersen | |
| 8,612,915 B1 | 12/2013 | Sundareswaran | |
| 8,667,443 B2* | 3/2014 | Smayling | G06F 30/394 716/122 |
| 8,843,884 B1 | 9/2014 | Koerner | |
| 8,863,058 B2 | 10/2014 | Nagrath | |
| 8,898,610 B1 | 11/2014 | Tagore-Brage | |
| 9,092,586 B1 | 7/2015 | Gustave et al. | |
| 10,083,269 B2 | 9/2018 | De Doos | |
| 10,796,053 B2 | 10/2020 | de Dood | |
| 10,983,514 B2* | 4/2021 | Cella | G06N 3/0445 |
| 11,062,073 B2* | 7/2021 | Jeffrey | G06F 30/39 |
| 2002/0006695 A1 | 1/2002 | Hatsch | |
| 2003/0154457 A1 | 8/2003 | Armbruster | |
| 2003/0200522 A1 | 10/2003 | Roberts | |
| 2004/0268283 A1 | 12/2004 | Perry | |
| 2007/0101306 A1 | 5/2007 | Bowers | |
| 2007/0234264 A1 | 10/2007 | Ono | |
| 2008/0172638 A1 | 7/2008 | Gray et al. | |
| 2008/0222576 A1 | 9/2008 | Hashimoto | |
| 2008/0282212 A1 | 11/2008 | Dennison et al. | |
| 2009/0031268 A1 | 1/2009 | Miranda et al. | |
| 2009/0092586 A1 | 4/2009 | Verfaillie et al. | |
| 2009/0199136 A1* | 8/2009 | Reis | G06F 30/30 716/132 |
| 2009/0307640 A1 | 12/2009 | Chapman et al. | |
| 2010/0199252 A1* | 8/2010 | Torvi | G06F 30/39 716/55 |
| 2012/0139582 A1 | 6/2012 | Cocchi et al. | |
| 2013/0125077 A1 | 5/2013 | Rozen et al. | |
| 2013/0234756 A1 | 9/2013 | Rebeor et al. | |
| 2013/0239078 A1 | 9/2013 | Chu et al. | |
| 2014/0270050 A1 | 9/2014 | Wang et al. | |
| 2015/0302135 A1 | 10/2015 | Park et al. | |
| 2016/0283614 A1 | 9/2016 | Bae et al. | |
| 2017/0132350 A1 | 5/2017 | Janac | |
| 2018/0173832 A1* | 6/2018 | Pittu | G06F 30/3312 |
| 2018/0341737 A1 | 11/2018 | Chow et al. | |
| 2021/0004515 A1 | 1/2021 | Chow | |

FOREIGN PATENT DOCUMENTS

| | | |
|---|---|---|
| JP | H07-262254 | 10/1995 |
| JP | H11-224278 | 8/1999 |
| JP | 2003/036280 | 2/2003 |
| JP | 2003-281210 | 10/2003 |
| JP | 2008-217651 | 9/2008 |

OTHER PUBLICATIONS

EP Office Action in European Application No. 16823537.2, dated Dec. 17, 2020, 7 pages.
Li et al., "Developing a design system to help reduce design cycle time" IEEE 10th International Conference, Oct. 2013, 4 pages.
PCT International Preliminary Report on Patentability in International Appln. No. PCT/US2016/068491, dated Mar. 22, 2019, 10 pages.
PCT International Search Report and Written Opinion in International Appln No. PCT/US2016/068491, dated Sep. 25, 2017, 20 pages.
wikipedia.org[online], "Pcell—Wikipedia," Mar. 2015, [retrieved on Sep. 13. 2017], retreived from: URL<https://en.wikipedia.org/wiki/Pcell>, 2 pages.
Extended European Search Report in European Appln. No. 22175554.9, dated Aug. 19, 2022, 11 pages.
Brief Communication in European Appln. No. 16823537.2, dated Oct. 7, 2022, 7 pages.
deparkes.co.uk [online], "How To Do L-Edit GDS Import," Mar. 17, 2015, retrieved on Oct. 12, 2022, retrieved from URL<https://deparkes.co.uk/2015/03/17/how-to-do-l-edit-gds-import/>, 6 pages.
wikipedia.org [online], "GDSII," Nov. 2016, retrieved on Oct. 12, 2022, retrieved from URL<https://en.wikipedia.org/wiki/GDSII>, 3 pages.
CN Office Action in Chinese Appln. No. 201680092045.3, dated Nov. 30, 2022, 17 pages (with English Translation).

* cited by examiner

INTEGRATED CIRCUIT DESIGN SYSTEM AND METHOD

CROSS-REFERENCE TO RELATED APPLICATIONS

This application is a continuation application of, and claims priority to, U.S. patent application Ser. No. 16/470,593, titled "INTEGRATED CIRCUIT DESIGN SYSTEM AND METHOD," filed on Jun. 18, 2019, which application is a National Stage Application under 35 U.S.C. § 371 and claims the benefit of International Application No. PCT/US2016/068491, filed Dec. 23, 2016. The disclosure of each of the forgoing applications are incorporated herein by reference.

BACKGROUND

Designers of systems, devices and software often utilize version control systems. A version control system manages changes to design information, such as documents, code and the like, in a logical and organized manner that facilitates revision proposals for review and eventual acceptance or rejection. The version control system enables the ability to readily understand the impact of changes, the editing of those changes, and corrections. The more complex the particular system being designed, the more likely it is that multiple designers are working on the system. Thus, version control systems help manage multi-developer projects.

SUMMARY

This specification describes technologies relating to integrated circuit design using editable component definitions that each define particular discrete circuit elements.

In general, one innovative aspect of the subject matter described in this specification can be embodied in methods that include the actions of generating, by user input, a plurality of component definitions, a component definition defining a discrete circuit component for use in an electronic circuit and including component metadata describing: a component type of the discrete circuit component defined by the component definition, geometric parameterization data defining physical dimensions of a physical realization of the discrete circuit component in one or more layers of an electronic circuit, and a version level of the discrete circuit component described by the component definition; wherein at least two version levels for a component definition for a same discrete circuit component differ in the physical dimensions defined by their respective geometric parameterization data; and storing, in a component definition library, the component definitions. Other embodiments of this aspect include corresponding systems, apparatus, and computer programs, configured to perform the actions of the methods, encoded on computer storage devices.

Another aspect of the subject matter described in this specification can be embodied in system that include the a data processing apparatus that includes one or more processor and a computer storage medium in data communication with the data processing apparatus and encoded instructions defining: a design module that, when executed by the data processing apparatus, causes the data processing apparatus to perform operations comprising: generating, by user input, a plurality of component definitions, each component definition defining a component for use in an electronic circuit and including component metadata describing: a component type of the component defined by the component definition; geometric parameterization data defining physical dimensions of a physical realization of the component in one or more layers of an electronic circuit; and a version level of the component described by the component definition; wherein for at least two version levels for a component defining for a same component differ in the physical dimensions defined by their respective geometric parameterization data; and a development module that, when executed by the data processing apparatus, causes the data processing apparatus to perform operations comprising: generating, by user input, a device design, the device design including device metadata describing: a set of components included in a device, and, for each component, a version level of the component; and a network list describing, for each of the components, circuit connections of the set of components included in the device; and a version level for the device design, each version level defining a unique combination of a network list, set of components, and version levels of the components; generating, from the device design, a circuit layout based on the set of components and circuit connections of the component included in the device, the generating the circuit layout including physically verifying the circuit layout for the version level. Other embodiments of this aspect include corresponding systems, apparatus, and computer programs, configured to perform the actions of the methods, encoded on computer storage devices.

Another aspect of the subject matter described in this specification can be embodied in methods that include the actions of accessing a device design stored in a data store, the device design including device metadata describing: a set of components included in a device, and, for each component, a version level of the component, wherein each component is defined by a component definition, each component definition defining the component for use in an electronic circuit and including component metadata describing a component type of the component defined by the component definition, geometric parameterization data defining physical dimensions of a physical realization of the component in one or more layers of an electronic circuit, a version level of the component described by the component definition, wherein for at least two version levels for a component defining for a same component differ in the physical dimensions defined by their respective geometric parameterization data; and a network list describing, for each of the components, circuit connections of the set of components included in the device; and a version level for the device design, each version level defining a unique combination of a network list, set of components, and version levels of the components; modifying, by user input, a selected component by changing the geometric parameterization data defining physical dimensions of the physical realization of the component to generate new geometric parameterization data that defines new physical dimensions of a physical realization of the component and generating a new version level for the component based on the changed geometric parameterization data; and generating, as a new component definition, the modified component metadata; and generation a new version level for the device design and physically verifying the circuit layout for the new version level. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. The extension of version control to discrete circuit component designs within a larger system design enables the rapid evaluation and analysis of device designs that incorporate the discrete circuit component. In other words, while an overall device design may not itself change in the context of the discrete components used, the impact on the device design by the changing of physical parameters of a discrete circuit component can be tracked according to a version level. This enables the generation of circuit layouts based on versions that incorporate changes at discrete component level for a particular component type without the need for labor-intensive design changes that would otherwise need be implemented for each discrete component in the absence of editable component definitions. The systems and methods described below address the technical problem of implementing version control on a constituent component basis. This also simplifies the design process for devices that implement circuit elements that are very small and are associated with sizes on the mesoscopic scale (e.g., having critical dimensions on the order of several microns or less) whose geometries are design factors. Example of such circuit elements include flux qubits, flux coupled inductors, interdigitated capacitors, co-planar waveguide resonators, and the like.

Moreover, the system and methods streamline collaboration for device design as syncing of documents is automatic and does not rely on manually trading files for specially designed components.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Version control works well for well-established systems in which the constituent system components are well-understood and well-defined. Examples of such constituent system components include previously defined integrated circuit elements, e.g., MOSFETS, resistors, etc. However, for certain designs in which constituent system components each require new designs, version control systems do not facilitate adequate version control of devices that incorporate the constituent system components. This is because while each underlying design change of a constituent system component may itself impact the overall design of the device, there is no capability readily available to implement version control at the constituent system component level.

An integrated circuit design system facilities version control for integrated circuit design, and particularly integrated circuit design using editable component definitions that each define discrete circuit components. The system allows designers to modify the geometry of a circuit element as a unit (e.g., capacitor plate areas, fluxmon qubit trace widths, etc.) and the modified geometry for the circuit element is applied across all affected circuit elements in a device design that incorporates the circuit element as constituent elements.

Thus, in addition to a netlist, which describes nodes and connections of elements in the device design, the system also incorporates parametrization of the dimensional geometry of the individual elements. When the parameters for an element are changed for a version, the system will adjust the circuit layout not only in connections but also in geometry, and the resulting mask will take into account the entire spatial impact to the design based on the geometric shifts.

These features and additional features are described in more detail below.

Figure 1:
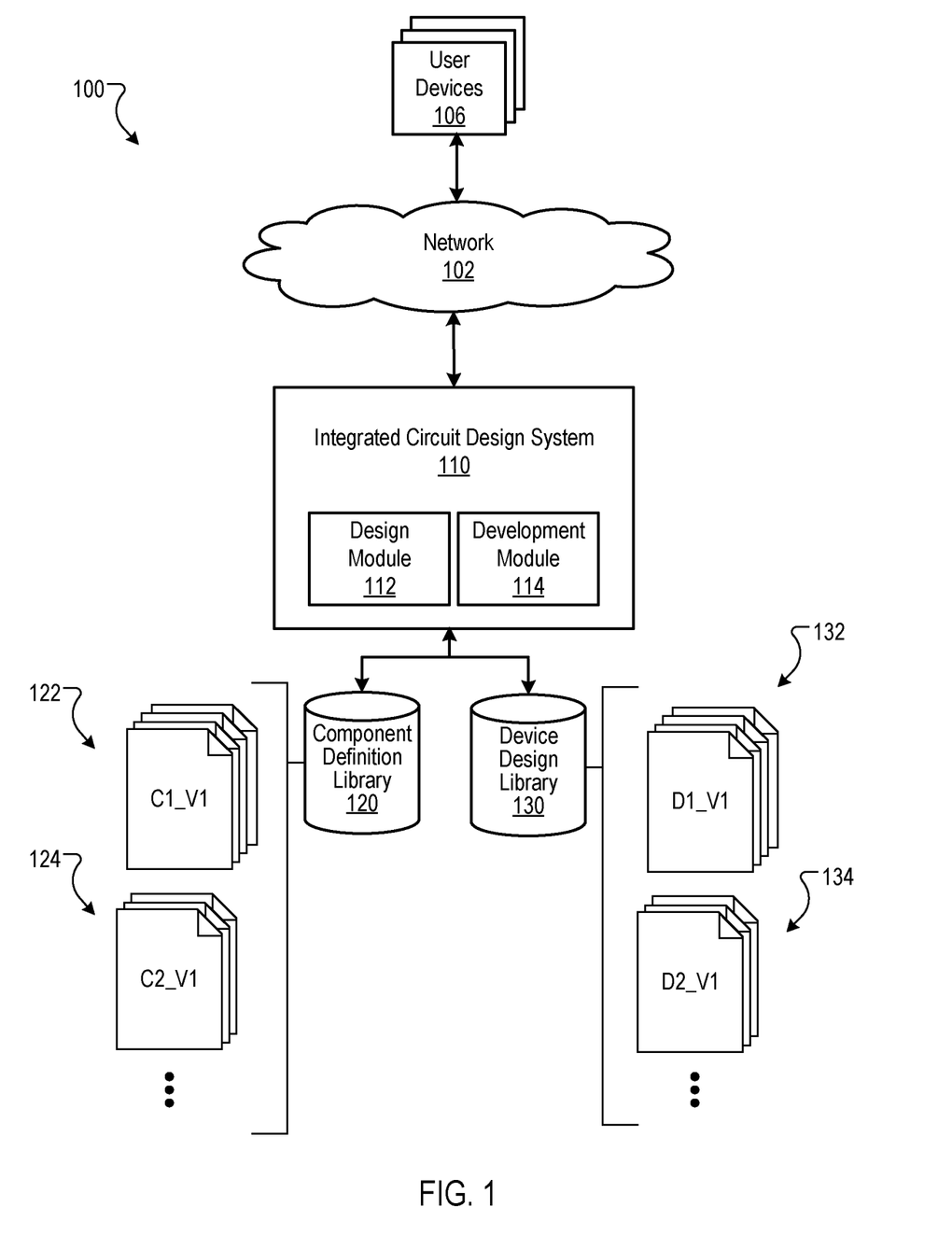
FIG. 1 is a block diagram of an example environment in which an integrated circuit design system is implemented.

FIG. 1 is a block diagram of an example environment 100 in which an integrated circuit design system 110 is implemented. A computer network 102, such as a local area network (LAN), wide area network (WAN), the Internet, or a combination thereof, connects user devices 106 with an integrated circuit design system 110. Each user device 106 is an electronic device capable of requesting and receiving resources over the network 102, and may execute an application that interfaces with the design system 110 to allow users to use the functions provided by the design system 110. Example user devices 106 include personal computers, pad computers, and the like.

An example implementation of the design system 110 includes a design module 112 and a development module 114. The modules 112 and 114 are but one example system architecture and other architectures that distribute the processes described below in a manner different than described can also be used.

The design module 112 is a program element that enables the creation, management and revision of component definitions describing discrete circuit components. The component definitions are stored in a component definition library 120. As used in this description, a component is a discrete circuit component that is defined by a component definition, and may be utilized as a design element unit in a device. For example, a fluxmon qubit, a planar capacitor, and a waveguide are each discrete circuit component defined by a component definition. Components and component definitions are described in more detail below.

The development module 114 is a program element that provides a set of tools and user interfaces for a group of developers to design a device. The development module stores device designs in a device design library 130. A device design is a set of discrete circuit components selected from component definitions stored in the component definition library 120, and a network list describing circuit connections of the set of discrete circuit components included in a device described by the device design.

The modification of a discrete circuit component used in a device design can be done by modifying its component definition. For example, a particular discrete circuit component may be a specially shaped wire that is commonly used in many sections of a device design, and in many other device designs. Changes to a component, e.g., fixes, enhancements, are stored in the component definition so that the changes are propagated to all designs automatically, increasing the reliability of the designs derived from these shared components.

The development module 114 also includes software tooling for automatic generation of features and verification common to all the designs. Such verification includes design rule checking (DRC), layout versus schematic checking (LVS), electrical rule checking (ERC), antenna checks, and other appropriate physical checks.

In operation, a user provides input to the design module 112 to generate or modify component definitions. Each component definition defines a discrete circuit component for use in an electronic circuit. The component definitions may be stored, in one implementation, as files that each include component metadata that describes a type, geometry, and version of a component.

In particular, a component type of the discrete circuit component defined by the component definition describes what the component is, e.g., a capacitor type, a gate type, a waveguide type, etc. This allows for designers, by use of the design module 112, to classifying and organize component definitions by type in the component definition library 120.

The component definition also includes geometric parameterization data defining physical dimensions of a physical realization of the discrete circuit component. The physical dimensions may be limited to a single plane, or may include multiple layers for an electronic circuit that is distributed over two or more layers. Example of geometric parameterization data are described in more detail with reference to FIGS. 2A and 2B.

A version level of the discrete circuit component describes a design version level of the component definition. Each different version level for a same component definition may describe a discrete component that differs in physical dimensions. For example, as depicted in FIG. 1, two sets of component definitions 122 and 124 and are shown. The first set 122 defines four different versions of a particular component, C1. The first version, V1, is represent by the top document labeled C1_V1. Likewise, the second set 124 defines three different versions of a particular component, C2.

Although only a component type, parameterization data, and a version level are described in the above examples, other attributes may also be included in the component definitions. Examples of such attributes include connection points, e.g., pad layouts, material specifications, e.g., metal types, and any other appropriate attributes that may be used in designing a discrete circuit component. Changes to any of these attributes in a particular component definition may also result in a new version of the component definition.

The user may also provide input to the development module 114 to define a device design. The device designs may be stored, in one implementation, as files that each include device metadata describing a set of discrete circuit components, a network list describing their interconnections, and a version level.

The set of discrete circuit components lists circuit components selected from component definitions stored in the component definition library 120. The set of discrete circuit components are the components that are included in the device described by the device design. The device design also includes the version level of each component.

The network list is a list describing circuit connections of the set of discrete circuit components included in the device. The network list describes the particular interconnections and nodes of the device design.

The version level for the device design defines a unique combination of a network list, set of discrete circuit components, and version levels of the discrete circuit components. For example, as depicted in FIG. 1, two sets of device designs 132 and 134 are shown. The first set 132 defines four different versions of a particular design, D1. The first version, V1, is represent by the top document labeled D1_V1. Likewise, the second set 134 defines three different versions of a particular design, D2.

As with the component definitions, other appropriate design attributes may also be stored in a device design.

In operation, the development module 114 can generate, from a device design, a circuit layout based on the set of discrete circuit components and circuit connections of the discrete circuit components included in the device. As described above, generating the circuit layout includes physically verifying the circuit layout for the version level. The circuit layout defines the corresponding patterns of metal, oxide, or semiconductor layers that make up the components of the integrated circuit defined by the device design. Provided the integrated circuit layout is verified, the resulting data may be stored in an industry-standard format, e.g., Graphic Database System II (GDSII), for foundry processing. The foundry processes the data to generate photomasks (or other foundry processing elements) for device fabrication.

By use of the development module 114, users may check out a snapshot of the current best state (master) or previous state of a device design from the device design library 130 and modify the design. When doing so, a new branch, or version, of the device design is created. Multiple users may work on a particular version at the same time.

A device design may change in response to modifying the number, position and connections of circuit components used in a device. However, a device design may also change in response to a modification of a particular circuit component definition. For example, a user may modify the component metadata for one of the component definitions of the discrete circuit components in the device design by changing the geometric parameterization data defining physical dimensions of the discrete circuit component. This will result the generation of new geometric parameterization data that defines new physical dimensions and a new version level for the discrete circuit component. The change of a component definition may be applied locally to a single device design, or, alternatively, may be applied globally to all device designs that incorporate the discrete circuit component affected by the change. For each affected device design, a new version level for the device design is generated, and the development module may physical verify the circuit layout for the new version level.

Figure 2A:
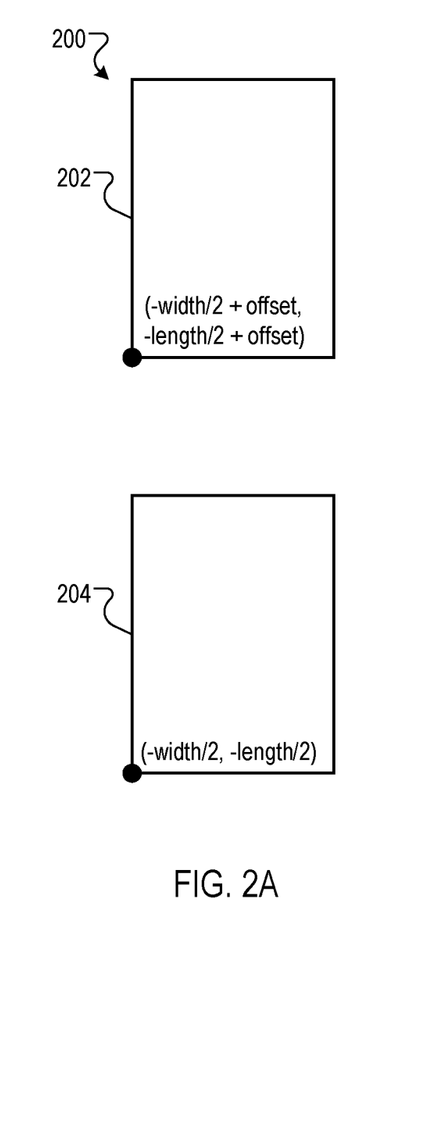
FIGS. 2A and 2B depict example planar capacitors defined by component definitions.
Figure 2B:
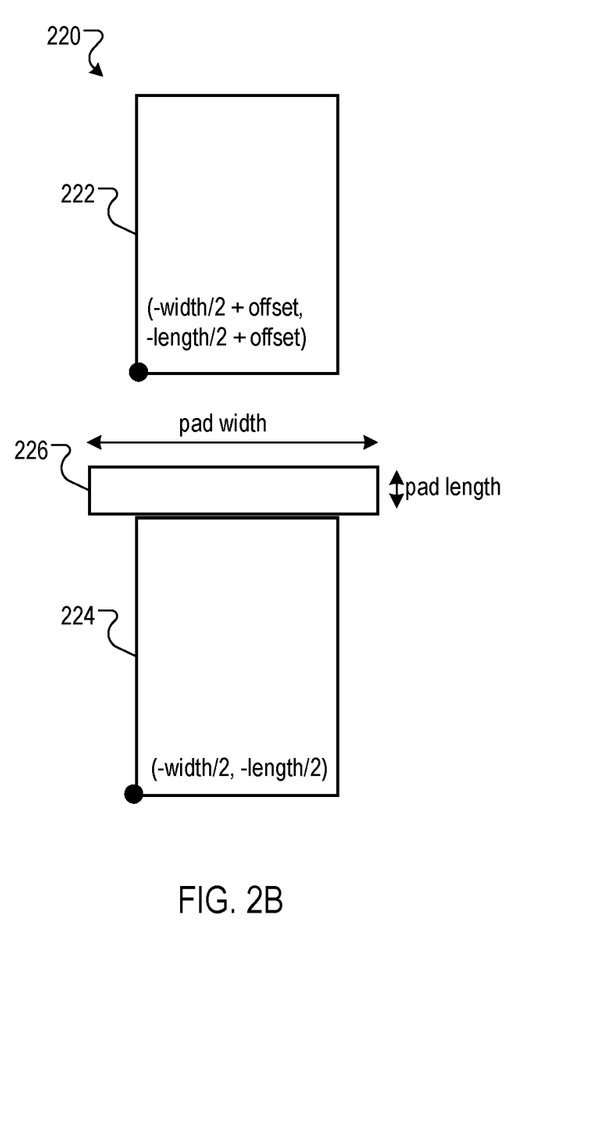

Revisions to a component definition are described with reference to FIGS. 2A and 2B, which depict examples planar capacitors 200 and 220 defined by component definitions. FIG. 2A depicts an in-plane capacitor defined by plates 202 and 204. The capacitor is defined by conductive traces and non-conductive traces. Example geometric parameterization data may be of the following form:

```
def inplane_capacitor(width, length, offset, wiring_layer):
  draw_box(
    -width/2,
    -length/2,
    width/2,
    length/2,
    wiring_layer)//draws plate one draw_box(
    -width/2+offset,
    -length/2+offset,
    width/2+offset,
    length/2+offset,
    wiring layer_layer)//draws plate two
```

For reference, original points are depicted in the lower left vertex of each plane electrode 202 and 204. As designer may use the definition for the capacitor 200, and, based on either simulation or prototype testing, may determine that a conductive pad is needed between the electrodes 202 and 204 to enhance capacitance. The resulting geometry is depicted in FIG. 2B, and the corresponding geometric parameterization data may be of the form:

```
def inplane_capacitor(width, length, offset, pad_width, pad_length, wiring_layer):
    draw_box(
      -width/2,
      -length/2,
      width/2,
      length/2,
      wiring_layer)//draws plate 1
    //draw plate two, with extra pad:
    draw_box(
      -width/2+offset,
      -length/2+offset,
      width/2+offset,
      length/2+offset,
      wiring_layer)
    draw_box(
      -pad_width/2,
      length/2,
      pad_width/2,
      length/2+pad_length,
      wiring_layer)
```

Thus, by simply modifying the geometric parameterization data, a user may generate a new version of an existing component definition that may be used in a single or multiple device designs.

Figure 3:
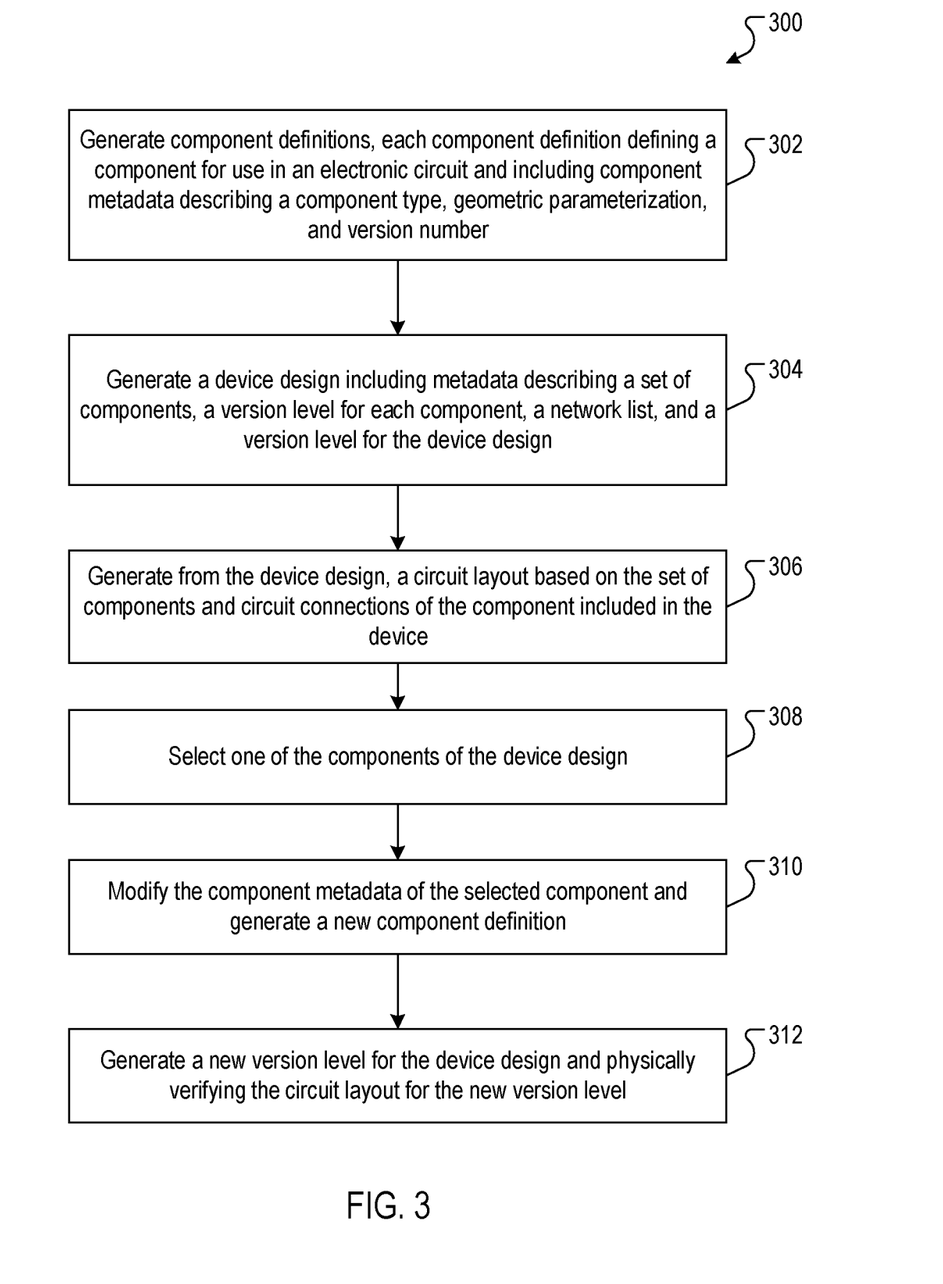
FIG. 3 is a flow diagram of an example process of generating component definitions and device design using the component definitions.

FIG. 3 is a flow diagram of an example process 300 of generating component definitions and device design using the component definitions. The process 300 may be used in the design system 100 of FIG. 1, and implemented in one or more computers.

The process 300 generates component definitions, each component definition defining a component for use in an electronic circuit and including component metadata describing a component type, geometric parameterization, and version number (302). Each component is a discrete circuit component. The geometric parameterization data defines physical dimensions of a physical realization of the discrete circuit component in or more layers of an electronic circuit.

The process 300 generates a device design including metadata describing a set of components, a version level for each component, a network list, and a version level for the device design (304). The set of discrete circuit components is selected from component definitions stored in the component definition library 120. The device design includes a version level for each component. The network list describes circuit connections of the set of discrete circuit components included in the device. The version level for the device design defines a unique combination of a network list, set of discrete circuit components, and version levels of the discrete circuit components.

The process 300 generates, from the device design, a circuit layout based on the set of components and circuit connections of the component included in the device (306). The generation includes verification of the device design.

The process 300 selects one of the components of the device design (308). For example, a user may select one of the components used in a device design to change the geometric shape of the component.

The process 300 modifies the component metadata of the selected component and generate a new component definition (310). For example, as shown in FIG. 2, a user may add a conductive pad between electrodes of an in-plane capacitor by modifying the geometric parameterization data. The process 300 may the generate a new version level for the device design and physically verifying the circuit layout for the new version level (312).

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any features or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
accessing a device design stored in a data store, the device design including device metadata describing:
a set of components included in a device, and, for each component, a version level of the component, wherein each component is defined by a component definition, each component definition defining the component for use in an electronic circuit and including component metadata describing a component type of the component defined by the component definition, geometric parameterization data defining physical dimensions of a physical realization of the component in one or more layers of an electronic circuit, a version level of the component described by the component definition, wherein for at least two version levels for a particular component define for the particular component different physical dimensions defined by their respective geometric parameterization data; and a network list describing, for each of the components, circuit connections of the set of components included in the device; and a first version level for the device design, each version level defining a unique combination of the network list, set of components, and version levels of the components, wherein the first version level specifies a first version level of the particular component;

selecting, by user input, a second version level for a particular component, the second version level specifying geometric parameterization data defining physical dimensions of the physical realization of the component that defines different physical dimensions of a physical realization of the particular component that is different from the physical dimensions of the physical realization of the particular component in the first version level; and in response to selecting the second version of the particular component, generating a second version level for the device design and a circuit layout for the second version level for the device design based on the set of components and circuit connections of the components included in the device based on the network list, and physically verifying the circuit layout for the second version level.

2. The method of claim 1, wherein the parameterization data defines, for each layer of each of one or more layers, element geometries for each circuit element of a component.

3. The method of claim 2, wherein the circuit elements includes conductive traces and non-conductive gaps between traces.

4. The method of claim 2, wherein the parameterization data further defines, for each layer of each of one or more layers, dispositions of element geometries from each other in each circuit element of a component.

5. The method of claim 1, wherein the components include fluxmon qubits.

6. A non-transitory, tangible computer storage medium encoded with a computer program, the program comprising instructions that when executed by data processing apparatus cause the data processing apparatus to perform operations comprising:

accessing a device design stored in a data store, the device design including device metadata describing:

a set of components included in a device, and, for each component, a version level of the component, wherein each component is defined by a component definition, each component definition defining the component for use in an electronic circuit and including component metadata describing a component type of the component defined by the component definition, geometric parameterization data defining physical dimensions of a physical realization of the component in one or more layers of an electronic circuit, a version level of the component described by the component definition, wherein for at least two version levels for a particular component define for the particular component different physical dimensions defined by their respective geometric parameterization data; and a network list describing, for each of the components, circuit connections of the set of components included in the device; and a first version level for the device design, each version level defining a unique combination of the network list, set of components, and version levels of the components, wherein the first version level specifies a first version level of the particular component;

selecting, by user input, a second version level for a particular component, the second version level specifying geometric parameterization data defining physical dimensions of the physical realization of the component that defines different physical dimensions of a physical realization of the particular component that is different from the physical dimensions of the physical realization of the particular component in the first version level; and in response to selecting the second version of the particular component, generating a second version level for the device design and a circuit layout for the second version level for the device design based on the set of components and circuit connections of the components included in the device based on the network list, and physically verifying the circuit layout for the second version level.

7. The non-transitory, tangible computer storage medium of claim 6, wherein the parameterization data defines, for each layer of each of one or more layers, element geometries for each circuit element of a component.

8. The non-transitory, tangible computer storage medium of claim 7, wherein the circuit elements includes conductive traces and non-conductive gaps between traces.

9. The non-transitory, tangible computer storage medium of claim 7 wherein the parameterization data further defines, for each layer of each of one or more layers, dispositions of element geometries from each other in each circuit element of a component.

10. The non-transitory, tangible computer storage medium of claim 6, wherein the components include fluxmon qubits.

11. A system, comprising:

a data processing apparatus; and a non-transitory, tangible computer storage medium encoded with a computer program, the program comprising instructions that when executed by the data processing apparatus cause the data processing apparatus to perform operations comprising:

accessing a device design stored in a data store, the device design including device metadata describing:

a set of components included in a device, and, for each component, a version level of the component, wherein each component is defined by a component definition, each component definition defining the component for use in an electronic circuit and including component metadata describing a component type of the component defined by the component definition, geometric parameterization data defining physical dimensions of a physical realization of the component in one or more layers of an electronic circuit, a version level of the component described by the component definition, wherein for at least two version levels for a particular component define for the particular component different physical dimensions defined by their respective geometric parameterization data; and a network list describing, for each of the components, circuit connections of the set of components included in the device; and a first version level for the device design, each version level defining a unique combination of the network list, set of components, and version levels of the components, wherein the first version level specifies a first version level of the particular component;

selecting, by user input, a second version level for a particular component, the second version level specifying geometric parameterization data defining physical dimensions of the physical realization of the component that defines different physical dimensions of a physical realization of the particular component that is different from the physical dimensions of the physical realization of the particular component in the first version level; and in response to selecting the second version of the particular component, generating a second version level for the device design and a circuit layout for the second version level for the device design based on the set of components and circuit connections of the components included in the device based on the network list, and physically verifying the circuit layout for the second version level.

12. The system of claim 11, wherein the parameterization data defines, for each layer of each of one or more layers, element geometries for each circuit element of a component.

13. The system of claim 12, wherein the circuit elements includes conductive traces and non-conductive gaps between traces.

14. The system of claim 12, wherein the parameterization data further defines, for each layer of each of one or more layers, dispositions of element geometries from each other in each circuit element of a component.

15. The system of claim 11, wherein the components include fluxmon qubits.

16. A computer-implemented method, comprising:
accessing a device design stored in a data store, the device design including device metadata describing:
a set of components included in a device, and, for each component, a version level of the component, wherein each component is defined by a component definition, each component definition defining the component for use in an electronic circuit and including component metadata describing a component type of the component defined by the component definition, geometric parameterization data defining physical dimensions of a physical realization of the component in one or more layers of an electronic circuit, a version level of the component described by the component definition, wherein for at least two version levels for a particular component define for the particular component different physical dimensions defined by their respective geometric parameterization data; and
a network list describing, for each of the components, circuit connections of the set of components included in the device; and
a first version level for the device design, each version level defining a unique combination of the network list, set of components, and version levels of the components, wherein the first version level specifies a first version level of the particular component;
modifying, by user input, the device design; and
in response to modifying the device design, generating a second version level for the device design and a circuit layout for the second version level for the device design based on the set of components and circuit connections of the components included in the device based on the network list, and physically verifying the circuit layout for the second version level.

17. The method of claim 16, wherein modifying the device design comprises modifying, by user input, a selected component by changing the geometric parameterization data defining physical dimensions of the physical realization of the component to generate new geometric parameterization data that defines new physical dimensions of a physical realization of the component and generating a new version level for the component based on the changed geometric parameterization data.

18. The method of claim 17, wherein the parameterization data defines, for each layer of each of one or more layers, element geometries for each circuit element of a component.

19. The method of claim 18, wherein the circuit elements include conductive traces and non-conductive gaps between traces.

20. The method of claim 18, wherein the parameterization data further defines, for each layer of each of one or more layers, dispositions of element geometries from each other in each circuit element of a component.

21. The method of claim 17, wherein the components include fluxmon qubits.

* * * * *